United States Patent
Smith et al.

(10) Patent No.: US 12,461,944 B2
(45) Date of Patent: Nov. 4, 2025

(54) MULTI-CLUSTER DUPLICATE RECORD DETECTION

(71) Applicant: State Farm Mutual Automobile Insurance Company, Bloomington, IL (US)

(72) Inventors: Austin Smith, Wesley Chapel, FL (US); Stephen Wilbourn, Royse City, TX (US); Heath Hafner, Mahomet, IL (US); Peter R. Wenzel, Bloomington, IL (US); Brian Setzler, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/615,663

(22) Filed: Mar. 25, 2024

(65) Prior Publication Data

US 2025/0298812 A1    Sep. 25, 2025

(51) Int. Cl.
| | | |
|---|---|---|
| *G06F 16/00* | (2019.01) | |
| *G06F 16/215* | (2019.01) | |
| *G06F 16/2457* | (2019.01) | |
| *G06F 16/28* | (2019.01) | |

(52) U.S. Cl.
CPC .......... *G06F 16/285* (2019.01); *G06F 16/215* (2019.01); *G06F 16/24575* (2019.01)

(58) Field of Classification Search
CPC . G06F 16/285; G06F 16/216; G06F 16/24575
USPC ....................................................... 707/737
See application file for complete search history.

(56) References Cited

U.S. PATENT DOCUMENTS

| | | | |
|---|---|---|---|
| 6,374,241 B1 | 4/2002 | Lamburt et al. | |
| 8,136,025 B1 * | 3/2012 | Zhu ....................... | G06F 16/951 |
| | | | 707/637 |
| 9,268,806 B1 * | 2/2016 | Kesselman ............. | G06F 16/22 |
| | | | 707/707 |
| 10,901,996 B2 | 1/2021 | Doan et al. | |
| 11,675,816 B1 * | 6/2023 | Chandrasekharan ....................... | |
| | | | G06F 11/3082 |
| | | | 707/737 |
| 11,676,072 B1 * | 6/2023 | Chandrasekharan ... | G06F 18/23 |
| | | | 706/12 |
| 11,704,285 B1 * | 7/2023 | Lamar ................... | G06F 11/324 |
| | | | 707/609 |

(Continued)

*Primary Examiner* — Alexandria Y Bromell
(74) *Attorney, Agent, or Firm* — Lee & Hayes, P.C.

(57) ABSTRACT

A duplicate record detector may retrieve and identify sets of corresponding records within a multi-cluster data storage system. The duplicate record detector initially may query each cluster to retrieve record sets including potentially duplicate records. The duplicate record detector then may use a multi-cluster index to reduce each of the initial record sets by determining which records have a corresponding potential duplicate record stored in another cluster. Matching logic may be used to compare and analyze the reduced record sets from each cluster, to determine duplicate records in other clusters using various matching criteria and including duplicate records having non-identical fields. The results of the duplicate record detector may be provided as output via a duplicate record report and/or to initiate automatic removal the duplicate records from one or more of the storage clusters.

20 Claims, 8 Drawing Sheets

(56) References Cited

U.S. PATENT DOCUMENTS

| | | | |
|---|---|---|---|
| 11,843,622 B1* | 12/2023 | Tellez | ................ H04L 63/1425 |
| | | | 707/707 |
| 2002/0013841 A1 | 1/2002 | Schweitzer et al. | |
| 2010/0005048 A1 | 1/2010 | Bodapati | |
| 2018/0196916 A1* | 7/2018 | van Rooyen | .......... G16B 50/30 |
| | | | 707/707 |
| 2021/0258400 A1* | 8/2021 | Therani | ............... H04L 67/5682 |
| | | | 707/707 |

* cited by examiner

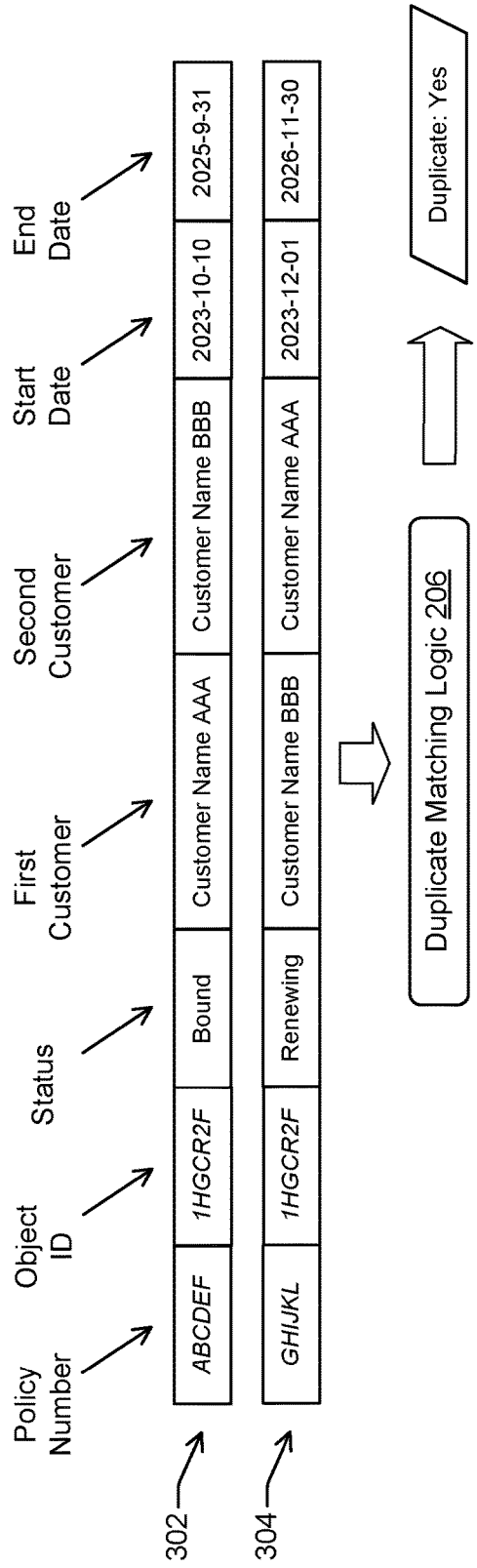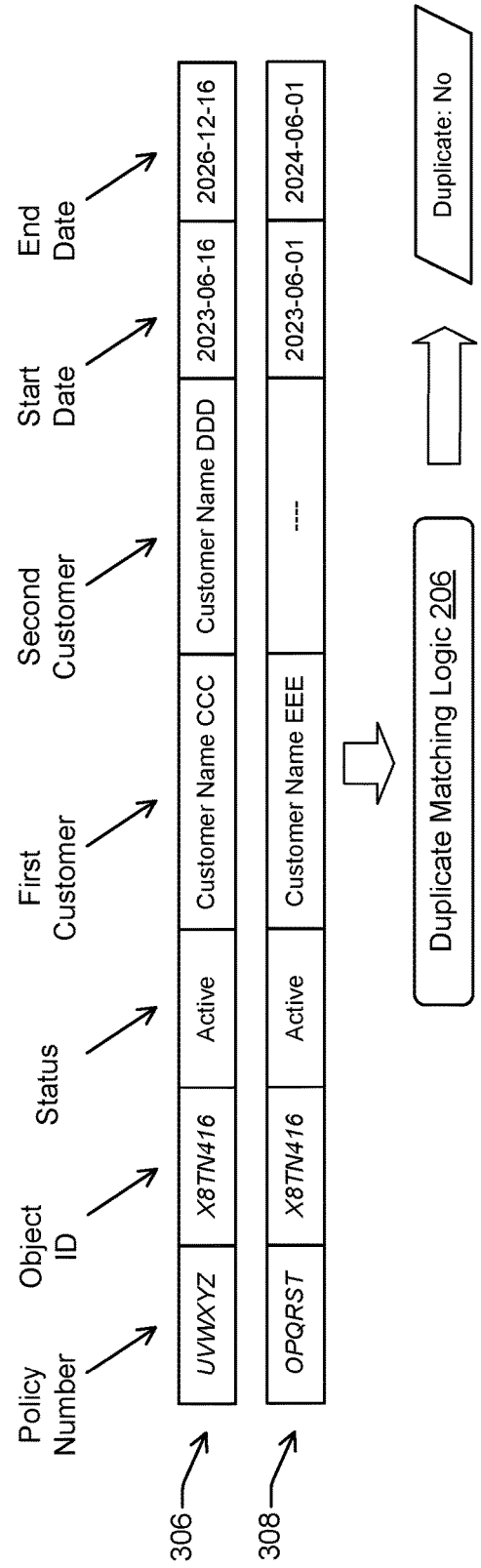
FIG. 3A
FIG. 3B

MULTI-CLUSTER DUPLICATE RECORD DETECTION

TECHNICAL FIELD

The present disclosure relates to management of records within large-scale and/or multi-cluster data storage systems.

BACKGROUND

Organizations often develop and maintain database systems to store and manage large amounts of organization data records. Examples of large-scale record management systems can be found within many technical fields and industries, and may include databases for storing product or sales records, employee or customer records, service or support records, etc. As a specific example, insurance companies may store policy records for automobile insurance policies, home or accident insurance policies, and/or other types of insurance policies, within databases that can include millions of separate policy records. In such examples, each policy record may correspond to one or more specific insured objects (e.g., vehicles, properties, items of value, etc.), and also may be associated with one or more customers, dates, accounts, statuses, and/or other data related to the policy record.

It also may be common for large-scale data storage systems to be stored in multiple clusters, each cluster having one or more data stores (e.g., databases). In a multi-cluster storage system, the clusters may be distributed across different datacenters, networks, and/or geographic regions. Distributed storage architectures such as these may provide advantages for large organizations, especially for organizations having multiple offices and/or clients on different networks and/or in different regions, and for organizations using cloud-based storage solutions to improve data accessibility, scalability, and performance.

However, when large-scale and/or distributed data storage systems, it can be difficult to perform cross-cluster queries and complex data management tasks. Cross-cluster services and specialized applications can be built to analyze or manage distributed data from a centralized data processing or analytics hub. However, the combination of large amounts of data and/or distribution of the data across multiple clusters may result in significant additional requirements in compute resources, memory, and bandwidth for the data processing/analytics hub to retrieve the data from the multiple clusters and analyze or modify the data.

Additionally, depending on how the data storage system is structured, multiple records relating to the same object, same customer, same account, etc., may reside on different clusters and/or databases. Analyzing such systems to identify duplicate or associated records may therefore require substantial compute and memory resources. Brute force searches to detect duplicate or associated records in large-scale systems may take hours or even days to execute, even within well-provisioned cloud-based computing architectures. Additionally, when the data storage system is a multi-cluster system with clusters distributed across different datacenters, networks, and/or geographic locations, large queries and duplicate searches may require significant network bandwidth, where any network delays or bottlenecks impact performance and increase the time to perform the query or search.

The example systems and methods described herein may be directed toward mitigating or overcoming one or more of the deficiencies described above.

SUMMARY

Described herein are systems and methods for retrieving and identifying sets of associated (e.g., duplicate) records within large-scale and/or multi-cluster data storage systems. As described herein, a duplicate record detector may retrieve and identify sets of associated records within large and/or multi-cluster data storage systems. In some examples, the duplicate record detector may initially query each cluster separately to retrieve record sets containing potentially duplicate records. A multi-cluster index may be used to reduce each of the initial record sets, by determining which records have a corresponding potential duplicate record stored in another cluster. Matching logic then may be used to compare and analyze the reduced record sets from each cluster, determining associated (or duplicate) records in other clusters using various matching criteria. The results of the duplicate record detector may be provided as output via a duplicate record report and/or to initiate automatic removal of the duplicate records from one or more of the storage clusters.

As used herein, "duplicate records" may refer to sets of identical records within the data storage architecture, or to sets of non-identical but otherwise duplicative (or associated) records that may be associated with the same object, account, individual, etc. For example, one set of duplicate records may be a pair of entirely identical records (e.g., records having the same fields/attributes and identical attribute values) stored in different tables, databases, and/or clusters. Such sets of identical duplicate records may be generated when different applications or services of the organization erroneously create the duplicate records, or when migrating records from a legacy system to an updated storage system, etc.

In other cases, "duplicate records" may be defined as sets of records having certain identical data fields and/or attributes, even though other fields or attributes of the records potentially may be non-identical. In such cases, the requirements for pairs or sets of records to be considered as duplicate records may vary depending on the type of data and objectives of the organization. As an example, within the databases of policy records maintained by an insurance provider, a set of duplicate records may be defined as multiple policy records indicating duplicate coverage of the same vehicle (or the same home, property, individual, etc.). In this example, two or more different policy records covering the same vehicle may be considered as duplicate records if they are associated with the same object identifier (e.g., the same vehicle identification number (VIN)) and the same customer(s), even though other data fields of the policy records (e.g., status, activation date, expiration date, agent, etc.) may be different. Duplicate policy records may include, for example, a single-car policy covering a vehicle and a multi-car policy covering the same vehicle, when other certain policy fields/attributes also match (e.g., customers, activation status, etc.). However, two different policy records covering the same vehicle but having different associated customers, different statuses, etc., might be considered non-duplicate records within the storage system. In some examples, duplicate vehicle policy records within an insurance policy database system may be caused by errors or failures during a consolidation process between single-car and multi-car policies. Examples of techniques for policy consolidation of multiple associated policies in a single policy can be found, for example, in U.S. Patent Application Publication No. 2022/0164890, filed Nov. 18, 2021, and titled "Multi-Cluster Policy Consolidation System," the contents of which are incorporated by reference herein in their entirety for all purposes.

In other examples, data storage systems for managing various types of data objects (e.g., products, individuals, accounts, service tickets, etc.) may apply different criteria for determining which records in the system are considered duplicates and which are considered non-duplicates. For instance, within a data storage system for managing products or service tickets, multiple records associated with the same object (e.g., the same unique product identifier, etc.) may be considered as duplicate records only when specific additional criteria are satisfied, such as the record being created within a particular time window, associated with a particular user or account, etc. As another example, service ticket records associated with a particular object, product, or device issue may be considered duplicate records if they are associated with the same individual (e.g., a user opening multiple service tickets for the same issue), but may be considered non-duplicate records if they are associated with the different individuals (e.g., different users, both with access to the same product/device, reporting issues separately).

As these examples illustrate, different storage systems and/or applications can use any number of techniques to analyze their records and determine when two or more records associated with the same object and/or object data are considered to be duplicate records. These techniques can range from simple (e.g., matching a single data field within the records) to computationally complex techniques requiring data filtering, analysis, and comparison of any number of data fields associated with sets of potentially duplicate records. In some cases, analyzing two or more records to determine if they are duplicate records within the data storage system can be done based entirely on the data fields (or attributes) within the records themselves. However, in other cases, a duplicate record detector may be required to retrieve additional data associated with the potentially-duplicate records, from other tables, databases, or data sources external/remote from the data storage system, and further analyze the additional data to determine whether the set of records are duplicate records. Thus, performing the various techniques for large and/or multi-cluster data storage systems can be time-consuming as well as compute and storage resource intensive for the system running the duplicate record detector. As noted above, brute-force search techniques to identify sets of duplicate records in large-scale systems can take hours or days to execute. Further, when the data storage system comprises a multi-cluster system with clusters distributed across different datacenters, networks, and/or geographic locations, the data retrieval and analysis required for detecting duplicate records can require significant bandwidth, and any network delays or bottlenecks can significantly impact performance and increase the time to perform the duplicate record analysis.

To address the technical challenges associated with retrieving and identifying duplicate records in large-scale and/or multi-cluster data storage systems, the techniques described herein include multi-step techniques in which a duplicate record detector may retrieve initial sets of potentially duplicate records separately from multiple clusters, may use a shared multi-cluster index to generate reduced record sets associated with each cluster, and then may use apply matching logic using automated tools to determine sets of duplicate record within the data storage system. As described below in more detail, the duplicate record detector may implement several features and techniques to improve the performance and reduce the computational and memory resources used to perform duplicate record analysis and detection in large and/or multi-cluster data architectures. Initially, the duplicate record detector may use pre-filtering queries to retrieve only certain records from the various clusters that may potentially be duplicate records, while excluding other records that can be identified as non-duplicates based solely on an analysis of the record itself. For instance, the pre-filtering queries may retrieve specific record sets from the various clusters corresponding to different types of records, different statuses, different locations, and/or different dates (e.g., record creation dates, activation dates, expiration dates, etc.) that potentially may be duplicate records.

After retrieving initial sets of potentially duplicate records from the various clusters, the duplicate record detector may apply a cross-cluster index to reduce the initial record sets for each cluster. In various examples, the index may be stored and maintained by a search server external to the clusters of the data architecture, or may be stored within and associated with one or more of the clusters. The index may be a cross-cluster index that stores a limited number of fields, but which includes data associations between at least one field of the potentially duplicate records and identifiers indicating clusters in which records having matching field values may be stored. For example, a data storage system may include a large number of records each containing an associated object identifier. The object identifier may correspond to a product identifier in a database of sales or service records, a vehicle (or property) identifier in a database of insurance policies, a user identifier in a database of employees or customers, etc. In these examples, the index may include an association between object identifiers and cluster identifiers (e.g., a sorted object identifier key). For instance, the key (or other association) may contain a cross-cluster listing of all object identifiers, along with an associated clusters identifier list for each object identifier. As an example, for a first object identifier, the index may indicate one or more object-related records are stored in Cluster 1, for a second object identifier the index may indicate object-related records stored in Clusters 2, for a third object identifier the index may indicate object-related records stored in Clusters 1, 2, and 4, and so on.

As noted above, the duplicate record detector may use the cross-cluster index to determine reduced (or pared) record sets based on the initial record sets received from the various clusters. In some examples, for each record retrieved from a first cluster, the duplicate record detector may determine one or more object identifiers associated with records (e.g., VINs, product IDs, etc.), and then may use the index to identify which of the additional clusters store records associated with the same object identifiers. For instance, for a record retrieved from a first cluster of a policy database relating to an insurance policy for a specific vehicle (VIN="12345"), the duplicate record detector may query the VIN-cluster data (e.g., a key or other association data) within the index to determine which clusters/databases store records associated with that VIN. If the only record returned from querying the VIN-cluster data in the index is the same record from the first cluster, then that record cannot have a duplicate record elsewhere in the data storage system and thus can be excluded from the reduced record set associated with the first cluster. In contrast, if the index indicates that additional records relating to the same VIN are stored elsewhere, either within the same cluster or a different cluster, then the record may potentially (but not necessarily) have duplicate records, and thus the record should be retained in the reduced record set associated with the first cluster.

After a reduced record set is determined for each cluster, by applying the cross-cluster index to pare down each of the initial record sets, the duplicate record detector may apply matching logic on the reduced record sets to definitively identify pairs/sets of duplicate records. In some examples, the duplicate record detector may import the reduced record sets into an aggregated data store (e.g., in a cloud-based computing environment), and may implement the duplicate matching logic on the aggregated data store. For instance, a programming language (e.g., Gosu) may execute the matching logic via Java virtual machine (JVM) in the cloud-based environment. As noted above, the matching logic can range from simple to quite complex, and may include retrieving, filtering, and/or transforming, and then matching data from any combination of fields within the potential duplicate records. As one example, potentially duplicate policy records may be considered to be duplicate records if they correspond to active and bound policies covering the same vehicle (e.g., same VIN) and are associated with the same set of customers. In this example, if two records are associated with the same set of multiple customers, but the customers are listed in different orders within the records, then the matching logic of the duplicate record detector may determine that the records are nonetheless duplicates. However, if the listings of customers associated with the records are overlapping (e.g., include one or more of the same individuals) but non-identical (e.g., also including at least one different individual), then the matching logic of the duplicate record detector may determine that the records are not duplicates. In various examples, the matching logic executed by the duplicate record detector may be customized by different services and/or applications to define sets of duplicate records in any way that is desirable to the service or application. Different matching logic may be implemented based on any combination of fields/attributes within the data records, comparisons of different values to other values and/or tolerance ranges, and/or may include retrieving and analyzing additional data external to the reduced record sets themselves.

When sets of (e.g., two or more) duplicate records have been identified by the duplicate record detector, it may be further configured to perform various additional operations on the duplicate records, including generating and outputting duplicate record reports for the data storage system and/or automatic record modification or removal for duplicate records. For instance, the duplicate record detector may include additional logic modules to determine, when a set of duplicate records has been identified, which of the duplicates should be modified or removed, and including code to implement the necessary database operations for modifying or removing the appropriate records. As one example, when a set of duplicate records is identified, the duplicate record detector may be configured to remove the duplicate record stored within a particular database or cluster (e.g., a legacy system) while retaining the record from the newer database or cluster. As another example, in a multi-cluster policy data store for vehicle insurance policies, the duplicate record detector may be configured to remove the single-car policies (e.g., regardless of cluster) when a duplicate multi-car policy is active for the same vehicle, same customers, etc. In other examples, the various services/applications can implement various other duplicate record modification or removal functionality to be triggered automatically when sets of duplicate records are detected.

As described herein, the techniques used by the duplicate record detector, and its associated components and/or other systems described in these examples, can improve the performance and accuracy of detecting duplicate (or otherwise associated) sets of records within large and/or multi-cluster data storage systems. For example, by using pre-filtering to retrieve specific initial record sets from the various clusters, the techniques herein can reduce the computational and memory resources, and preserve network bandwidth when detecting duplicate records in large and/or multi-cluster data architectures. These techniques can also leverage one or more cross-cluster indexes, to generate reduced record sets in an intermediate step before applying the duplicate matching logic, thereby reducing the compute and memory requirements of the duplicate detection process and improving the execution time. Further, through customization of the pre-filtering queries and/or the record matching logic applied by the duplicate record detector, these techniques may provide improved efficiency and flexibility by allowing different systems, applications, and/or services to implement unique definitions of duplicate or associated records.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A and 3B illustrate examples of applying matching logic to identifying sets of duplicate or non-duplicate records, in accordance with one or more examples described herein.

DETAILED DESCRIPTION

Figure 1:
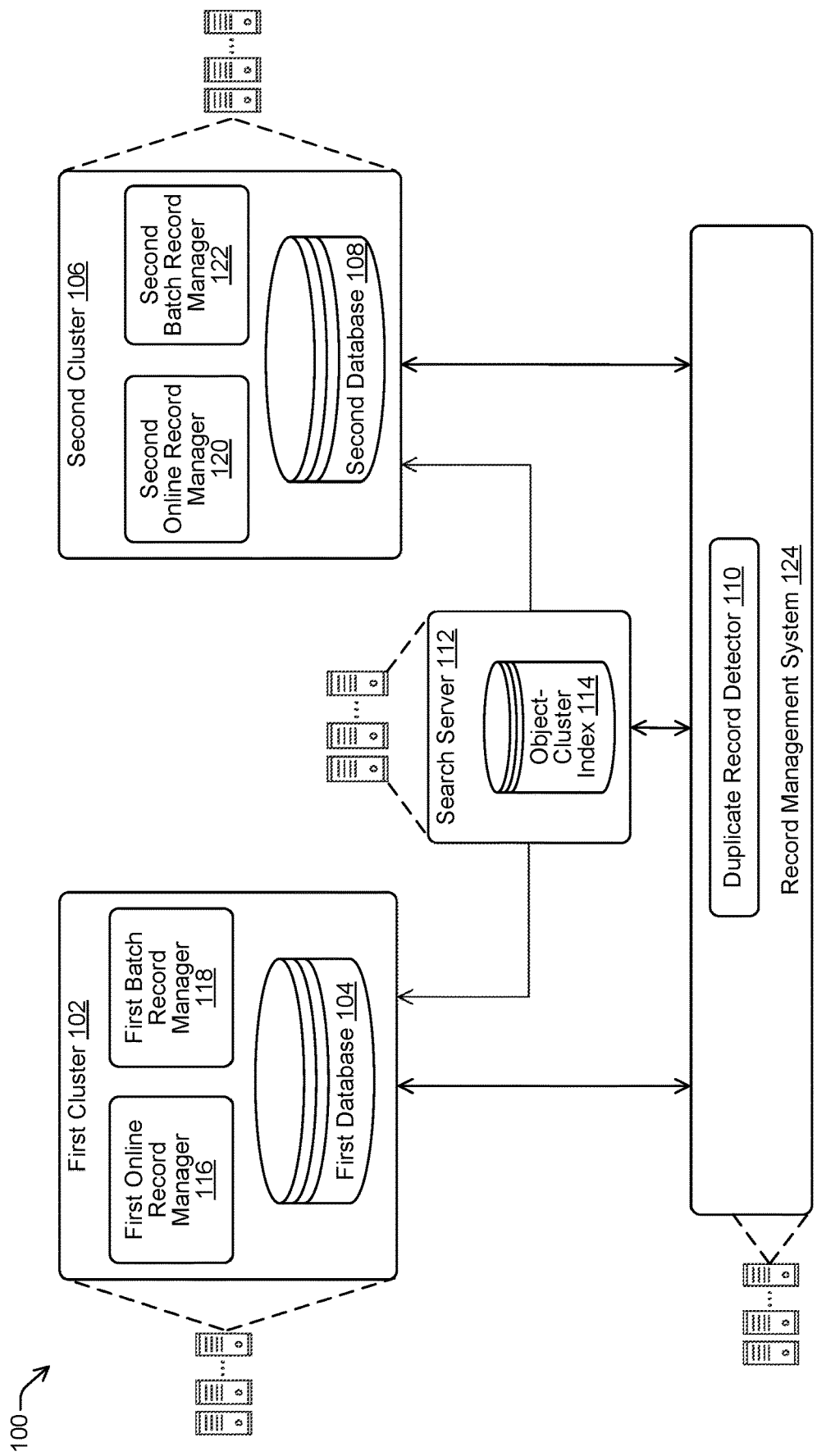
FIG. 1 shows an example of a multi-cluster data storage and management architecture, including a duplicate record detector, in accordance with one or more examples described herein.

FIG. 1 shows an example computing environment 100 including a multi-cluster data storage system, a search server including a multi-cluster index, and a duplicate record detector configured as described herein to retrieve and determine duplicate records within the data storage system. In this example, the multi-cluster system includes a first cluster 102 storing a first database 104, and a second cluster 106 storing a second database 108. The duplicate record detector 110, described below in more detail, may be configured to retrieve records from the various clusters of the data storage system and analyze the records to identify duplicate/associated sets of records. Although this example depicts two clusters and two databases, in other examples, the duplicate record detector 110 and techniques described herein may be applied to single-cluster and single-database storage systems. These techniques also may be applied in other multi-cluster data architectures having three or more (e.g., any number) of clusters and databases. As described above, the first cluster 102 and the second cluster 106 (and/or any additional clusters) may be implemented within different data centers of an organization. The cluster databases 104 and 108 thus may be distributed geographically and/or accessible to the duplicate record detector 110 via different access networks.

In some examples, the computing environment 100 may correspond to a policy record storage and management system of an insurance provider. For instance, an insurance company may offer one or more types of insurance policies, including automobile insurance policies, fire insurance policies, home insurance policies, workers compensation insurance policies, life insurance policies, and/or other types of insurance policies. In some cases, an insured party may have more than one insurance policy of the same type with the same insurance company. For example, a household may have two different automobile insurance policies that each cover a different vehicle owned by members of the household. As another example, a company may operate a fleet of vehicles, and may have different insurance policies for each different vehicle in the fleet. Thus, the data storage system may include many associated and/or duplicate policy records, and for a large-scale provider, the system may include millions or billions of separate policy records. However, while certain examples herein are described in reference to a policy record storage system of an insurance provider, in other examples, the computing environment 100 and storage system may be associated with any other record-based storage system. For instance, the computing environment 100 may be associated with product record systems (e.g., sales or inventory), user databases, service ticket databases, telecommunications record systems, computer network record systems (e.g., tracking network connections, messages, transactions, etc.), etc.

As shown in this example, each of the first cluster 102, second cluster 106, duplicate record detector 110, and search server 112 may be implemented on separate computing architectures, using separate servers and/or within datacenters. However, in other examples, one or both of the duplicate record detector 110 and/or the search server 112 may be implemented within one of the clusters. Additionally, some or all the components depicted in FIG. 1 may be implemented within cloud computing environments, to provide improved performance, data security, and scalability as the numbers of records and/or compute workload increases for each component.

Cluster 102 and cluster 106 (and/or any other clusters in the data storage system) may be associated with, and/or may be executed by, a different set of one or more servers or other computing elements. As shown in this example, each cluster can include one or more instances of an online record manager and/or a batch record manager. For instance, cluster 102 includes an online record manager 116 and a batch record manager 118, and cluster 106 includes an online record manager 120 and a batch record manager 122. Each online record manager and/or each batch record manager may be linked to the respective databases, such that these components can access record data to edit records and/or otherwise interact with the databases. In some examples, each cluster may include multiple instances of an online record manager and/or a batch record manager, which may each interface with the same database or mirrored and/or synced instances of the same database.

In some cases, the online record managers 116 and 120 may be user-facing components of the data storage/management system. The online record managers may include user interfaces and/or application programming interfaces (APIs) that allow users to view record data about the data record stored in their respective databases, edit record data in the databases, create new records, store corresponding records in the databases, and/or otherwise interact with data records in the databases 104 and 108, respectively. In an example of an insurance policy record data store, authorized insurance agents may use the user interface of the online record managers 116 and 120 to view and/or edit policy data for insurance policies associated with customers of the insurance agent.

The batch record managers 118 and 122 may include back-end components that are configured to perform various automated operations with respect to the records stored in their respective databases 104 and 108. In some examples, the batch policy managers may be configured to automatically perform operations to manage and/or update batches of records within the databases. In some examples, the batch record managers 118 and 122 can be configured to perform various batch operations such as record auditing, record updating, data cleaning, and the like. The batch operations may be performed on a nightly basis, during low usage times and/or periods of time in which the online record managers are less likely to be used. In other examples, the batch record managers 118 and 122 can be configured to perform batch operations, on their respective databases 104 and 108, during any other periodic, occasional, or scheduled basis, and/or on demand.

The online record managers 116 and 120, and/or the batch record managers 118 and 122 can be associated with the duplicate record detector 110 described herein. In some examples, the duplicate record detector 110 may be a component of the online record managers and/or the batch policy managers. Alternatively, as shown in FIG. 1, the duplicate record detector 110 can be a separate component of the data storage system, which the online record managers and/or the batch record managers can access or initiate.

As shown in this example, each different cluster may have one or more databases that hold different record sets within the data storage and management system. Large-scale organizations such as insurance companies, retailers or online merchants, telecommunications or network providers, and the like, may store different sets of data records in distinct databases with two clusters, three clusters, four clusters, five clusters, or any other number of clusters. In some examples, if the storage space allocated to a database of one cluster becomes full or becomes filled to above a threshold level, a new instance of the record management system with a new and separate database can be spun up or created with respect to a new cluster, such that more storage space for record data becomes available in the new cluster.

Within a multi-cluster data storage and management environment, such as computing environment 100, the elements in one cluster may be at least partially isolated from elements in other clusters. For example, the first instance of the online record manager 116, the first instance of the batch record manager 118, and/or the first database 104 might not be in direct communication with the second (or other)

instances of the online record manager 120, the second batch record manager 122, and/or the second database 108. Accordingly, record data stored in the database of one cluster may not be directly accessible by instances of the online record manager, the batch record manager, and/or other applications or services within other clusters.

As described herein, the duplicate record detector 110 may be configured to retrieve records from, and to add/delete/update within the first cluster 102 and the second cluster 106 (and additional clusters in the data architecture). In particular, the duplicate record detector 110 may be configured to generate queries to retrieve initial record sets from the various clusters within the computing environment 100, then to use one or more indexes (e.g., index 114) within the search server 112 to determine reduced record sets from each cluster. The duplicate record detector 110 then may apply duplicate matching logic to identify sets of duplicate records (e.g., records associated with the same object(s)). After determining sets of one or more duplicate records, which may reside in a single database and/or cluster, or may reside across multiple databases and multiple clusters, the duplicate record detector 110 may generate various duplicate record reports and/or initiate automated processes to remove or modify some or all of the duplicate records within their respective clusters.

In some examples, the duplicate record detector 110 may execute within and/or may be associated with a record management system 124. The record management system 124 may be configured to receive and process records, which may include assigning different records to different clusters. For instance, the record management system 124 may receive data relating to new or existing records (e.g., product records, policy records, communication session records, etc.) that are being migrated from a legacy system or other data source. These records may be assigned to one of the various clusters within the data storage system. In some examples, the record management system 124 may perform load-balancing operations when assigning records to the various clusters, migrating records between clusters, etc. For instance, the record management system 124 may receive data associated with clusters 102 and 106 and their respective databases 104 and 108, such as how many records are currently stored in each database, the capacity of each database, the available memory in each database, and/or other attributes of each database. The record management system 124 may use this data to determine where to store individual records and/or batches of records.

In some instances, the record management system 124 may attempt to assign records to different clusters and/or databases based on a determination that the records are related in one or more respects. For instance, the record management system 124 may assign all of the records from a particular legacy server, from a particular geographic region, from a particular time period, having the same user/account identifier, etc., to the same cluster and/or the same database. However, as described herein, even when such record assignment or record migration policies are implemented by the record management system 124, such policies still may fail to assure that all duplicate records are stored within the same cluster and/or same database. For example, after a record consolidation process (or any other record modification), a record in the first cluster 102 that was previously not duplicative of a record within the second cluster 106 may become a duplicate record. Therefore, to perform adequate duplicate record detection over the entire data storage system as described herein, it may be necessary for the duplicate record detector 110 to retrieve and analyze sets of records from multiple clusters and/or multiple databases.

In some examples, when the record management system 124 assigns or migrates records into a particular cluster and/or database, the record management system 124 may update the index 114 to indicate which cluster(s) and/or which databases store those records. As shown in this example, the index 114 may store mapping data (e.g., a sorted object identifier key) associating particular object identifiers with the cluster(s) storing records associated with those object identifiers. An object identifier may include any data field associated with a record, such as a product identifier field, a policy identifier field, a user identifier field, a device identifier field, etc.), and the cross-cluster index 114 may maintain mapping data, key-value pairs, or other information that associates the object identifiers within the individual records of the data storage system, with corresponding cluster identifiers that uniquely identify the clusters that store records relating to those objects. In various examples, the index 114 within the search server 112 may be maintained by the record management system 124, by the individual clusters 102 and 106, and/or by a combination of the cross-cluster record management system and the individual clusters. For instance, the record management system 124 may update the index 114 when it assigns records to a cluster, removes records, and/or migrates records between clusters. Similarly, the individual clusters also may update the index 114 when records are added, modified, and/or removed from their databases.

The record management system 124 and/or the search server 112 may execute cross-cluster applications and/or services that execute separately from and/or outside the clusters 102 and 106. Thus, the duplicate record detector 110 may include a cross-cluster service capable of accessing the databases in multiple clusters, and/or may interface with any number of instances of the online record managers and the batch record managers in the various clusters 102 and 106. For example, the record management system 124 and/or the duplicate record detector 110 may execute at a separate server or computing device that is different from the computing elements associated with the clusters 102 and 106, but may be in data communication with the computing elements associated with the clusters 102 and 106.

Overall, by executing the duplicate record detector 110 via a cross-cluster system and/or service, independently or within the record management system 124, the duplicate record detector 110 can access information about records stored in databases of multiple clusters. Accordingly, the duplicate record detector 110 executing with cross-cluster capabilities can retrieve and identify duplicative and/or associated records even if information associated with these records is initially stored in different clusters.

Figure 2:
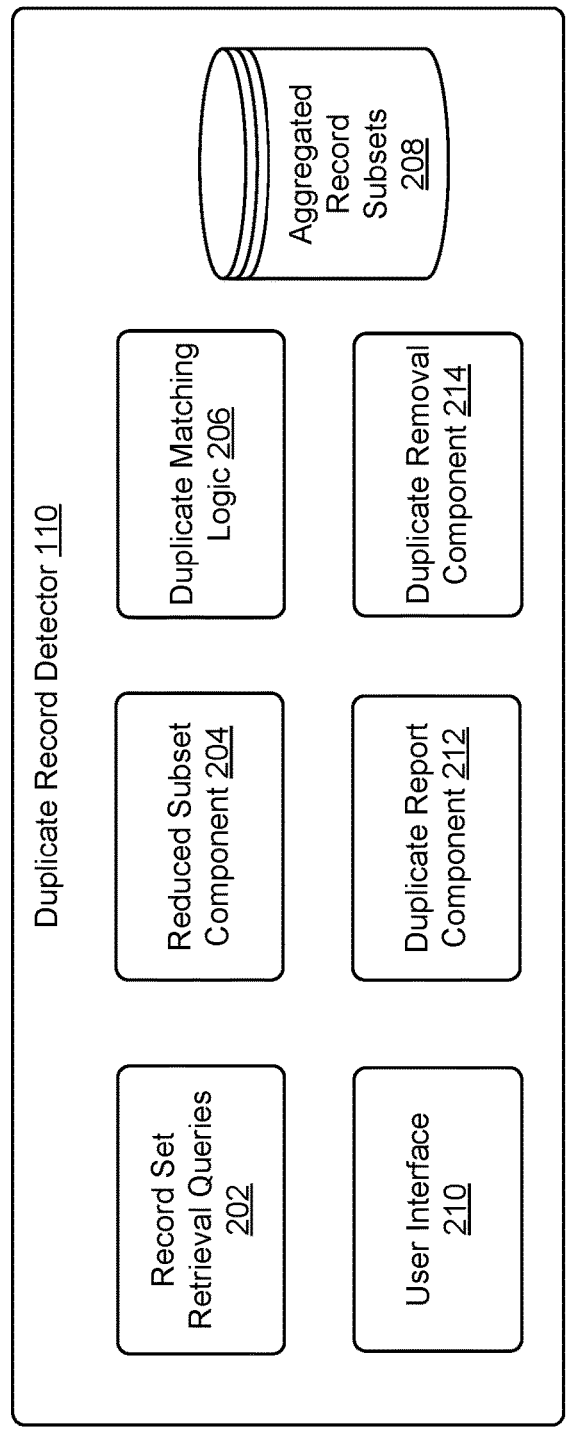
FIG. 2 depicts an example system including components implementing a duplicate record detector, in accordance with one or more examples described herein.

FIG. 2 depicts an example system 200 including various components within an illustrative duplicate record detector 110 configured to retrieve records and determine sets of duplicative/associated records within a large-scale and/or multi-cluster data architecture as described herein. As shown in this example, the duplicate record detector 110 may include record set retrieval queries 202, a reduced subset component 204, and duplicate matching logic 206, each of which may be used in combination in retrieve and detect duplicate/associated records within the multi-cluster data storage system. The duplicate record detector 110 also may include an aggregated record subset database 208, which may be configured to receive and store and the initial record sets from the various clusters, and/or the reduced record sets generated by the reduced subset component 204, so that the duplicate matching logic 206 can be applied to the reduced subsets efficiently in a local computing environment. Additionally, in some examples, the duplicate record detector 110 also may include one or more of a user interface 210, a duplicate report component 212, and/or a duplicate removal component 214.

The record set retrieval queries 202 may be used by the duplicate record detector 110 to query and retrieve initial record sets from each of the clusters in the multi-cluster storage system. The record set retrieval queries 202 may represent pre-filtering queries, which are designed to retrieve only those records from each cluster that may potentially be duplicate records. Thus, the record set retrieval queries 202 may be designed to exclude any records that can be identified as non-duplicates based on the record data fields and/or attributes, as well as based on additional data retrieved from the same cluster. In various examples, the same record set retrieval queries 202 may be transmitted to each cluster and/or database, to retrieve specific record sets from the clusters including specific types of records, specific statuses, specific locations, and/or specific dates, etc.

The reduced subset component 204 may be configured to apply one or more multi-cluster indexes (e.g., index 114) to the initial record sets received from the clusters using the record set retrieval queries 202. As described above, the reduced subset component 204 may apply the index(es) to reduce the size of the initial record sets, by removing (or paring) any records that do not have corresponding potential duplicates within the other clusters. For example, index 114 may include a sorted key based on an object identifier field (referred to as a sorted object identifier key). In such a key, the index 114 may store a sorted listing of unique object identifiers associated with any records in the multi-cluster data store. For each unique object identifier, the key also may store a list of clusters containing at least one record including (or associated with) the object identifier. To generate the reduced record sets, the reduced subset component 204 may initially query to multi-cluster index 114 and then remove all records from the initial record sets when that do not have matching object identifiers (e.g., VINs, product identifiers, etc.) within one or more other clusters. As discussed above, when a first record retrieved from a first cluster 102 is associated with a particular object identifier (e.g., a VIN), the presence of a record within the second cluster 106 associated with the same object identifier does not assure that those records are duplicates. However, in this example, when the index 114 indicates that there is no record in second cluster 106 (or any other cluster) associated with the same object identifier, this may confirm that the first record within the first cluster 102 cannot be a duplicate of any other record within the multi-cluster data store.

After determining reduced record sets associated with each of the clusters, using the reduced subset component 204, the duplicate record detector 110 may apply duplicate matching logic 206 to the reduced record sets to identify pairs/groups of duplicate records. In some examples, the duplicate record detector 110 may aggregate the sets or reduced records within an aggregated record subset database 208, which may be local with respect to the duplicate matching logic 206, for more efficient processing and determination of the duplicate records.

In some examples, the record set retrieval queries 202 might not retrieve the entire/complete records (e.g., all data fields) from the clusters and/or databases, but might retrieve only a subset of the data fields of those records sufficient to determine whether or not the records are duplicates. Additionally or alternatively, the record set retrieval queries 202 can be executed in two stages, as a first set of queries executed before determining the reduced record subsets, and a second set of queries executed after. In these examples, the first set of queries 202 may retrieve a limited number of data fields that can be compared to the data fields of the multi-cluster index 114 (e.g., for determining the reduced record set). However, this first set of queries 202 might not include additional data fields used by the duplicate matching logic 206 to determine duplicate sets of records. Therefore, in these examples, a second set of queries 202 may be used to retrieve the additional data fields used by the duplicate matching logic 206, but only for those records from each cluster that are retained in the reduced record subset. These techniques may further reduce bandwidth usage and database access usage/costs in some implementations.

As shown in this example, the duplicate record detector 110 may include additional components including one or more user interfaces 210, to allow applications and services within the computing environment 100 to access the features and functionality of the duplicate record detector 110. The user interfaces 210 may include, for example, graphical user interfaces, command line user interfaces, and/or application programming interfaces (APIs), to allow users or client applications/services to define the pre-filtering queries 202, select the multi-cluster indexes and fields that will be used for reducing the record sets, and defining the duplicate matching logic 206.

As noted above, the duplicate record detector 110 also may include components configured to perform one or more downstream operations automatically in response to the detection of duplicate record sets. As shown in this example, the duplicate record detector 110 may include duplicate report component 212, which may be configured to automatically initiate the duplicate detection operations described herein and/or to generate output reports identifying the duplicate records and their native storage locations (e.g., clusters and databases). Additionally or alternatively, the duplicate record detector 110 may include a duplicate removal component 214 configured to automatically initiate modification and/or removal operations within the clusters and/or databases of the data storage system, based on the detection of a set of duplicate records.

FIGS. 3A and 3B depict two examples in which the duplicate record detector 110 may apply duplicate matching logic 206 to determine whether or not a pair of records retrieved from the multi-cluster data storage system are to be considered as duplicate (or associated) records. Although the duplicate matching logic 206 is shown comparing pairs of records in these examples, in other examples, the duplicate matching logic 206 may be used similarly to compare groups of three or more records. The pairs (or groups) of records compared using the duplicate matching logic 206 may be records retrieved from the multi-cluster data storage system (and may be stored within the same cluster or different clusters), and included within the reduced record sets determined by the reduced subset component 204.

The techniques depicted in FIGS. 3A and 3B for comparing groups of records to determine whether they represent duplicate records, can be performed for any number of record groups/subgroups within the reduced record sets retrieved from the clusters and pared down based on the index 114. As described above, the reduced record sets can be aggregated into an aggregated record subset database 208. After the aggregation of the reduced record sets, the duplicate record detector 110 may sort and/or group the aggregated records based on or more data fields (e.g., an object identifier, user identifier, device identifier, account identifier, etc.), and then may apply the duplicate matching logic 206 to each group to determine whether or not the group of records are duplicates.

As discussed above, "duplicate" records can refer to identical records, but also may refers to non-identical records having particular overlapping data fields and/or meeting particular criteria to be defined as associated or duplicative records. In various examples, different data storage systems, and different applications/services associated with the storage system, may can duplicate records in different ways. In the examples depicted in FIGS. 3A and 3B, duplicate records may correspond to active policy records of an insurance provider that are associated with the same customer(s) and that cover the same object (e.g., vehicle).

For example, in FIG. 3A, the duplicate matching logic 206 is used to compare a first policy record 302 to a second policy record 304. In this example, because the policy records 302 and 304 are both active (e.g., having a status of active, bound, renewing, and not expired), and both policy records 302 and 304 cover the same object identifier (e.g., vehicle VIN), and both policy records 302 and 304 are associated with the same two customers, the duplicate matching logic 206 determines that policy records 302 and 304 are duplicates. For instance, in FIG. 3A, the policy records 302 and 304 may represent a single-car policy and a multi-car policy that cover the same vehicle at the same time. Based on the detection of the of policy records 302 and 304 as duplicate records, the duplicate record detector 110 may output a notification, report, or other indication of the detection of the duplicate records, and/or may initiate operations to modify or remove one or more of the duplicate records.

As another example, in FIG. 3B, the duplicate matching logic 206 is used to compare a third policy record 306 and a fourth policy record 308. Unlike the previous example, in this case the duplicate matching logic 206 may determine that, because the sets of customers in the policy records 306 and 308 do not match, that these policy records are not to be considered as duplicates. For instance, in FIG. 3B, the policy records 302 and 304 may represent separate policies initiated by different customers for the same vehicle (e.g., a shared vehicle, recently sold vehicle, or employer vehicle), and thus should not be considered as duplicative coverage records.

Although these examples relate to identifying duplicate records to detect duplicative insurance policies covering the same vehicle, in other examples, different definitions of duplicate records may be implemented via the duplicate matching logic 206 to identify associated or duplicative records within other types of data storage systems and/or other applications or services operating on the data storage system. As one example, a multi-cluster data store may be configured to store and manage network communication data captured by different network endpoints (e.g., servers, routers, network monitors, etc.) in a computer network. In this example, the duplicate matching logic 206 may be implemented to define duplicate records as multiple records of network messages that are associated with the same network communication and/or connection, even when the records may have slightly different timestamps or may be captured by different network endpoints, etc. As another example, a multi-cluster data store may be configured to store and manage product records (e.g., sales of inventory records), and the duplicate matching logic 206 may be implemented to define duplicate records as multiple status and/or routing records relating to the same physical instance of the product, in order to identify and remove redundant status or routing records.

Figure 4A:
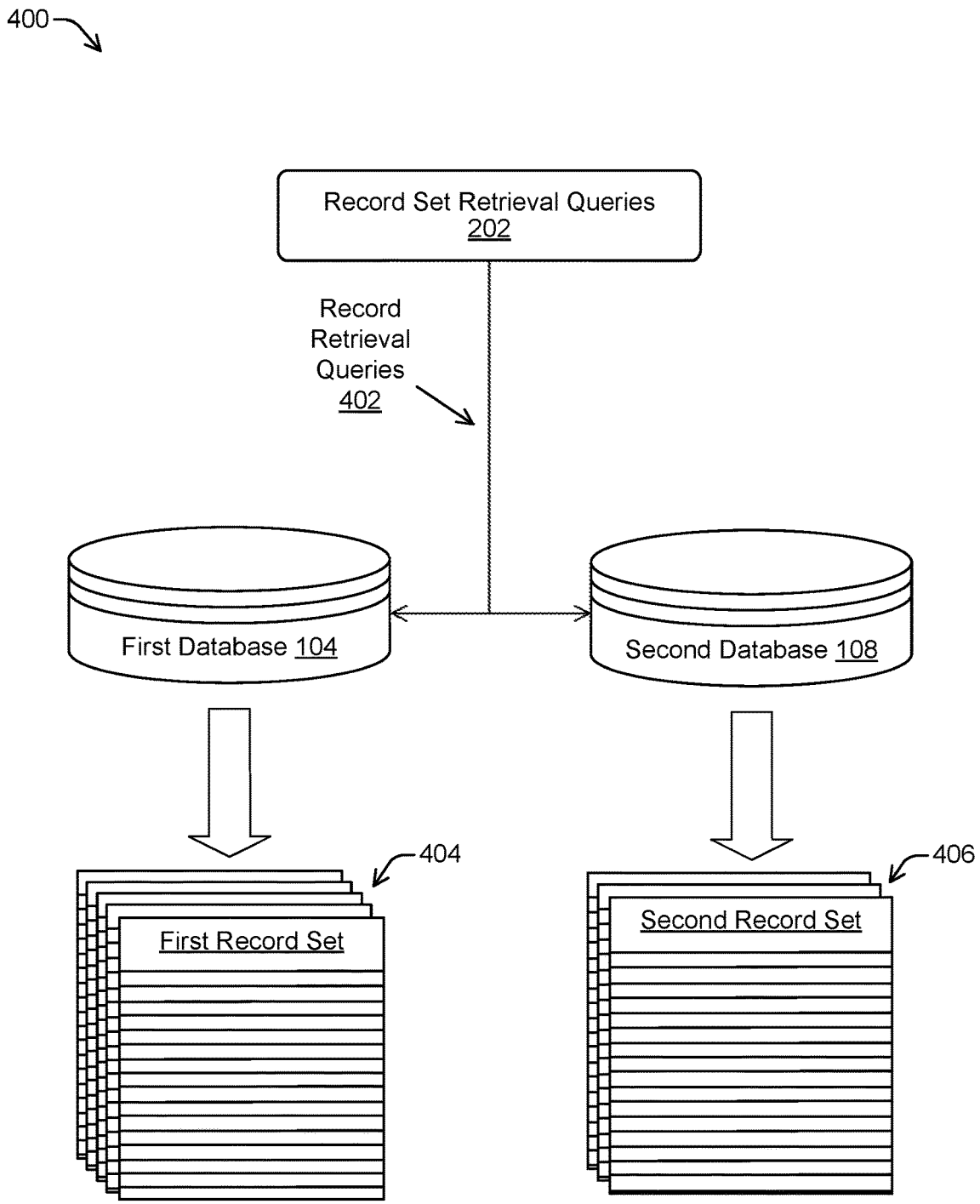
FIGS. 4A-4C depict example techniques of a multi-step process using a duplicate record detector to retrieve and determine sets of duplicate records from a multi-cluster data storage system, in accordance with one or more examples described herein.
Figure 4B:
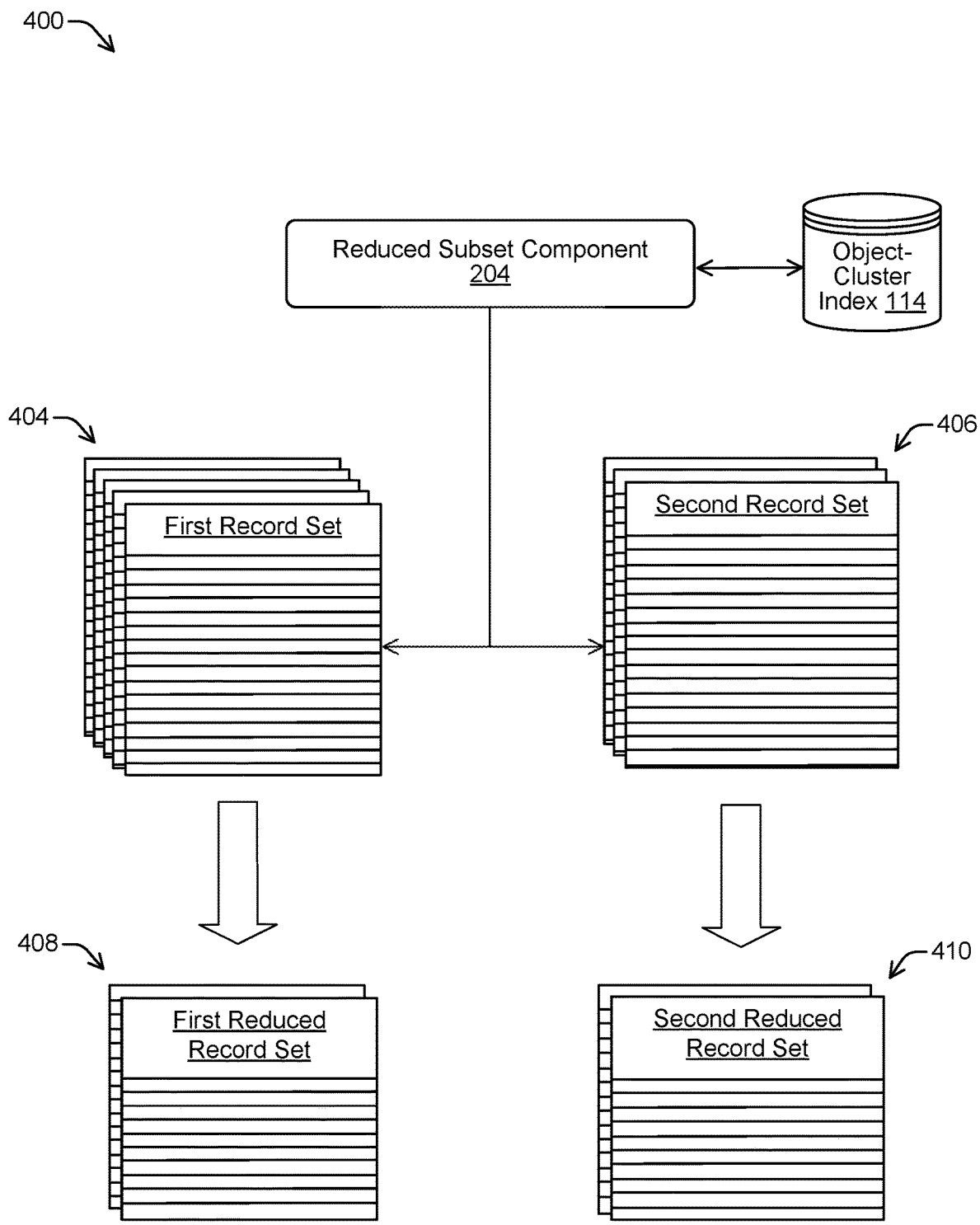
Figure 4C:
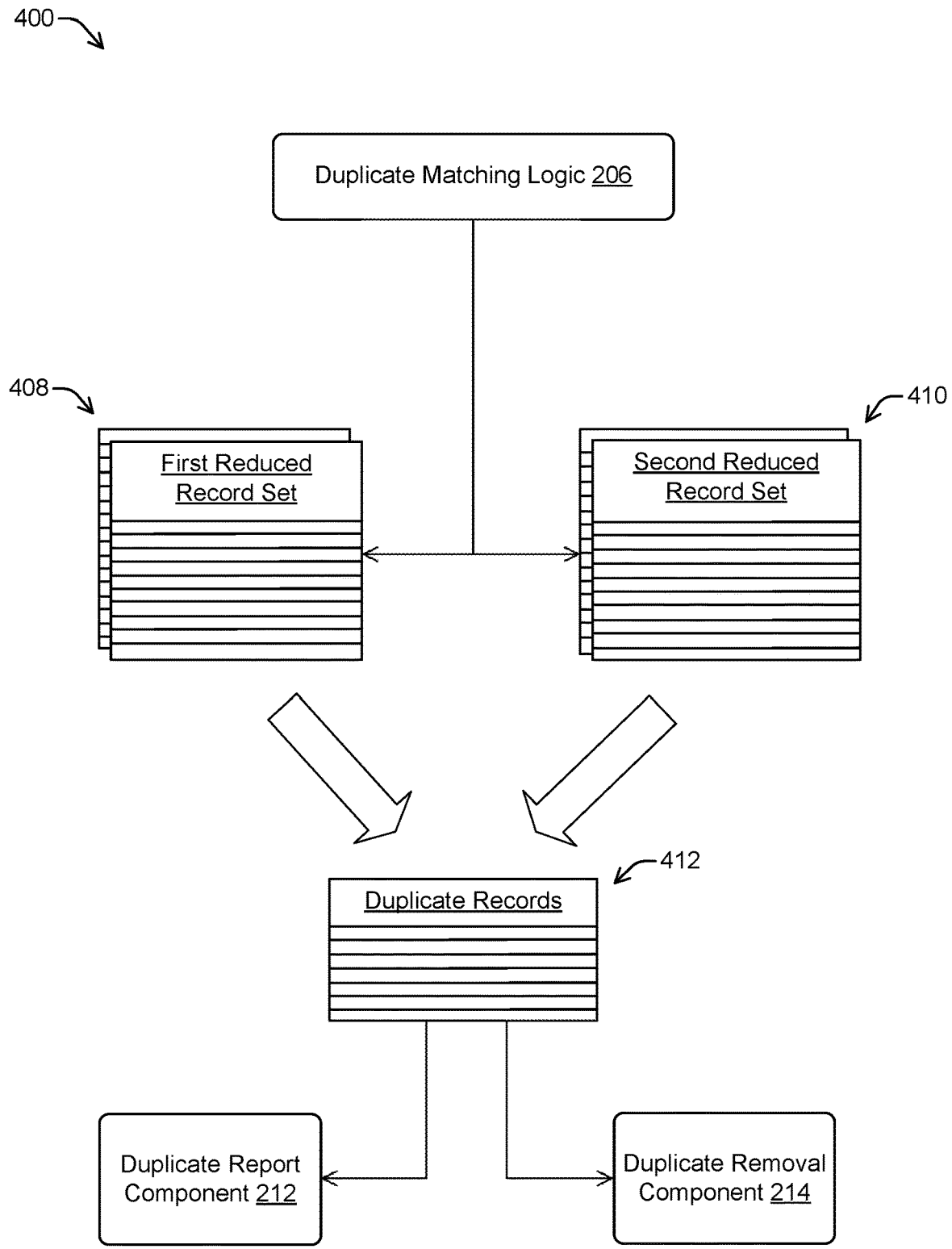

FIGS. 4A-4C depict an example multi-step operation 400 in which the components of the duplicate record detector 110 are used to retrieve record sets from clusters, reduce the record sets based on the multi-cluster index 114, and then determine pairs/sets of duplicate records. Initially, in FIG. 4A, the duplicate record detector 110 executes record set retrieval queries 202 in operation 402, executing the same set of queries on each cluster database within the data store. As shown in this example, the results of the record set retrieval queries 202 performed on the respective clusters are represented as a first initial record set 404 (e.g., retrieved from cluster 102) and a second initial set 406 (e.g., retrieved from cluster 106).

In FIG. 4B, the duplicate record detector 110 may use the reduced subset component 204 to reduce the initial record sets 404 and 406 into corresponding reduced record sets 408 and 410. As described above, the reduced subset component 204 may retrieve one or more multi-cluster indexes (e.g., index 114) and compare one or more data fields from each of the initial record sets 404 and 406 to the data field within the index 114. The index 114 may store the data associations (e.g., keys) between one or more of the record data fields (e.g., VINs or other object identifiers, product identifiers, user identifiers, account identifiers, device identifiers, etc.) and the clusters storing records having those identifier data fields. For instance, a data association within the index 114 may include a particular object identifier and a listing of clusters within the data store containing at least one record associated with the object identifier. Thus, when the reduced subset component 204 identifies a record within the initial record sets 404 and 406 for which there is a not an associated record (e.g., relating to the same object) in the other clusters of the data architecture, then the reduced subset component 204 may exclude the record when determining the reduced record sets 408 and 410.

In FIG. 4C, after the determining the reduced record sets 408 and 410, the duplicate record detector 110 may apply the duplicate matching logic 206 to aggregate and compare the records within the reduced record sets 408 and 410, to determine one or more sets of duplicate records 412. As described herein, duplicate records 412 may include pairs or sets of records stored in the same cluster and/or different clusters, and may include identical or non-identical records matching specific duplicate criteria. After identifying one or more sets of duplicate records, the duplicate record detector 110 may use the duplicate report component 212 to output a report and/or notifications identifying the duplicate records and/or their storage locations (e.g., cluster and database). Additionally or alternatively, the duplicate removal component 214 may be invoked to automatically remove and/or modified one or more duplicate records, for instance, by removing duplicate records from legacy systems, combining multiple records associated with the same object, user, or event, etc.

Figure 5:
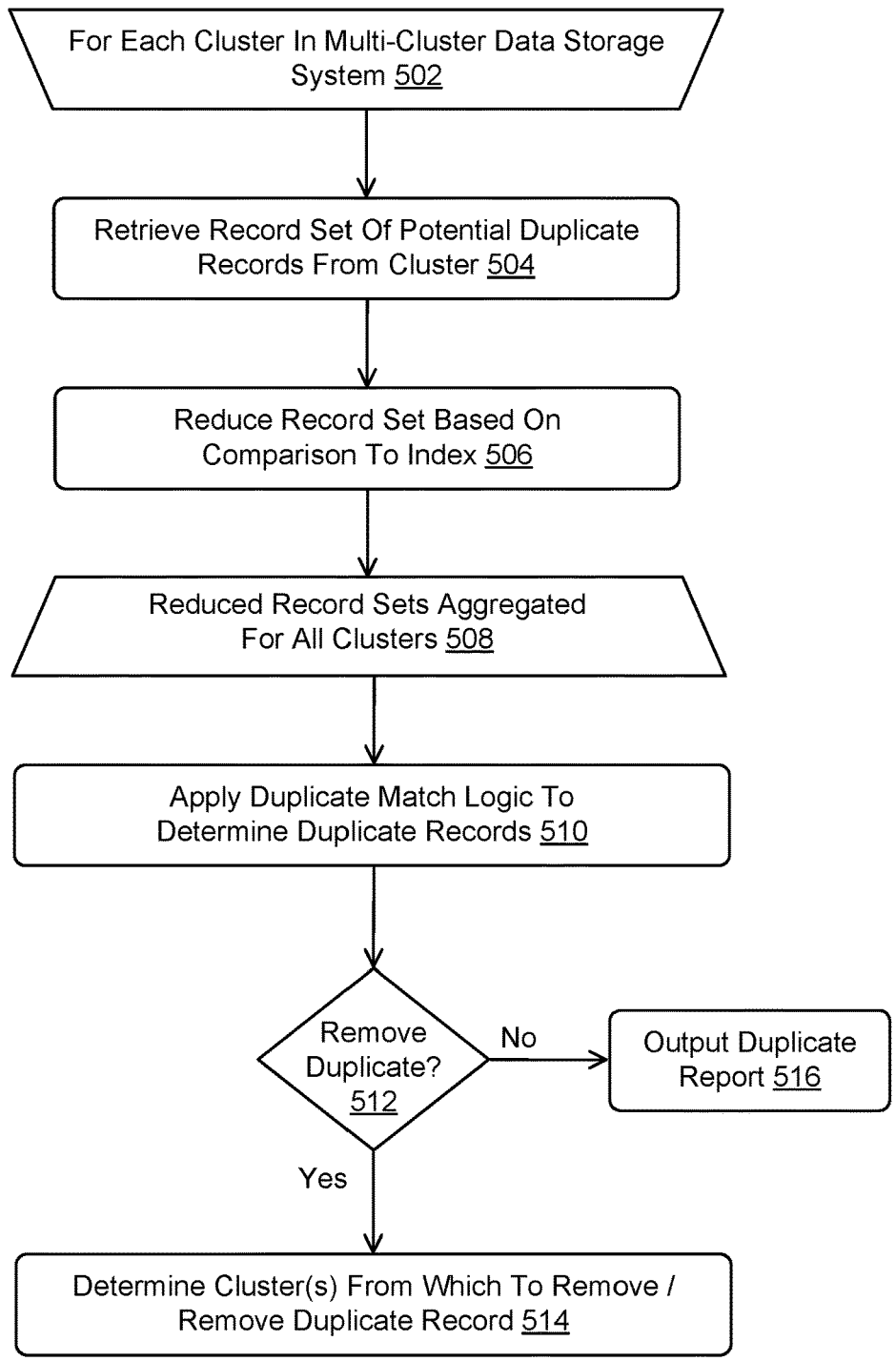
FIG. 5 is a flow diagram illustrating an example process of detecting a set of duplicate records from a data storage system, in accordance with one or more examples described herein.

FIG. 5 is a flow diagram illustrating an exemplary computer-based process 500 of detecting a set of duplicate records within a multi-cluster data storage system. In various examples, some or all of the operations of process 500 may be performed by a duplicate record detector 110 executing within a record management system 124 and/or elsewhere within a multi-cluster storage environment 100.

As shown in this example, at operation 502, the duplicate record detector 110 may perform operations 504-508 iteratively (e.g., in parallel using separate process thread) for each cluster within the storage system. Although computing environment 100 depicts two clusters, multi-cluster data storage system can include any number of clusters in various examples. At operation 504, the duplicate record detector 110 may use record set queries 202 to retrieve sets of potential duplicate records respectively within each cluster. As described above, the record set queries 202 may correspond to pre-filtering queries designed to retrieve only records from each of the clusters that may potentially be duplicate records. In some examples, the record set queries 202 also may retrieve only the limited set of data fields needed to compare the records with the multi-cluster index 114.

At operation 506, the duplicate record detector 110 may use the reduced subset component 204 to compare the initial record sets retrieved in operation 504 for each cluster, to the multi-cluster 114. As described above, the reduced subset component 204 may determine reduced record sets by paring (e.g., excluding) each record in the initial records relating to an object, where the object does not have any additional associated records within the other clusters.

At operation 508, the duplicate record detector 110 may aggregated the reduced record subsets determined for each of the various clusters (e.g., into an aggregated record subset database 208). At operation 510, the duplicate record detector 110 then may execute the duplicate matching logic 206 on the records in the aggregated record subset database 208, to determine which of the potentially duplicate records can be considered duplicate records within the multi-cluster system. As discussed above, duplicate records may include pairs or sets of records stored in the same cluster and/or different clusters, and may include identical or non-identical records matching specific duplicate criteria. In one example described above, the duplicate matching logic 206 may apply to a policy database of an insurance provider to identify as duplicates policy records that are cover the same vehicle, with separate active and non-expired policies, and have the same set of customers (in any order) associated with the policies. However, in other examples, duplicate matching logic 206 may implement different definitions of "duplicate" records in different storage systems, and different applications/services also may define different duplicate record types within the same storage system.

At operation 512, when the duplicate record detector 110 is configured to automatically remove duplicate records (512: Yes), the duplicate record detector 110 may invoke a duplicate removal component 214 in operation 514 configured to automatically initiate modification and/or removal operations within the native clusters and/or databases, to update or delete the duplicate records. For instance, operation 514 may include the duplicate removal component 214 applying first logic to determine which of the duplicate records to remove or modify (e.g., based on their source systems, creation date, associated users or accounts, etc.), and then issuing instructions to the respective clusters/database as described herein to update/remove the duplicate records. In other examples, the duplicate record detector 110 may be configured not to remove or modify any duplicate records detected in operation 510 (512: No). In these examples, the duplicate record detector 110 may invoke a duplicate report component 212 configured to automatically generate output reports and/or notifications identifying the duplicate records and their native storage locations (e.g., clusters and databases).

Figure 6:
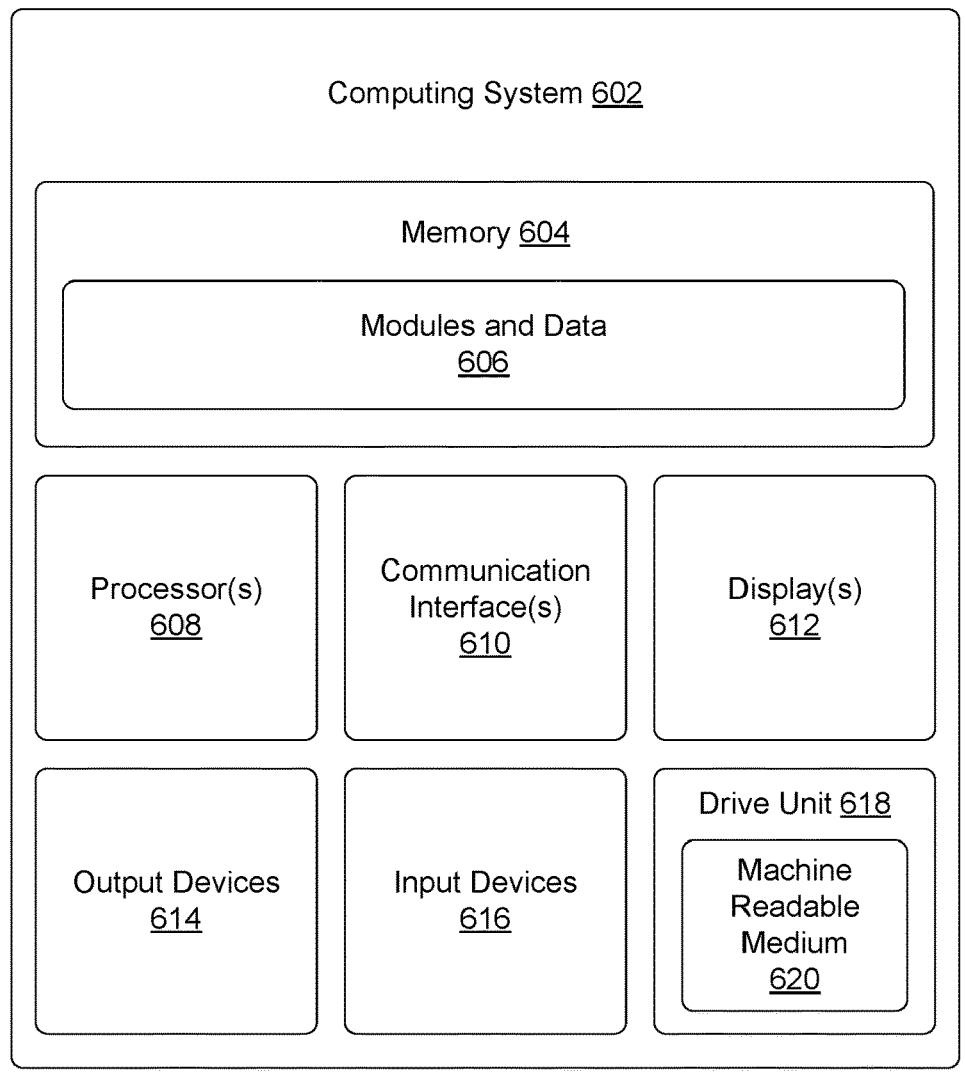
FIG. 6 shows an example system architecture for a computing device associated with the duplicate record detector.

FIG. 6 shows an example system architecture 600 for a computing device 602. As described herein, one or more of the computing device 602 may be used to implement the duplicate record detector 110 described herein. Additionally or alternatively, the search server 112 and/or clusters 102 and 106 may be implemented via one or more of the computing device 602. In various examples, the computing device 602 can be a server, computer, or other type of computing device that executes the duplicate record detector 110 and various additional components related thereto. In some examples, the computing device 602 can be configured to perform the method 500 described above with respect to FIG. 5, for example by executing a duplicate record detector 110 that has access to the clusters 102 and 106 (and/or other clusters) and databases 104 and 108 (and/or other databases as shown in FIG. 1. In some examples, the computing device 602 may also execute one or more other elements of a record management system 124 associated with the duplicate record detector 110, and/or applications or services within the clusters such as online record managers, the batch record managers, record importers or migrators, cross-cluster services, cluster assignment systems, and/or the cross-cluster index 114.

The computing device 602 can include memory 604. In various examples, the memory 604 can include system memory, which may be volatile (such as RAM), nonvolatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 602. Any such non-transitory computer-readable media may be part of the computing device 602.

The memory 604 can store modules and data 606. The modules and data 606 can include data associated with the duplicate record detector 110, such as the record set retrieval queries 202, duplicate match logic 206, aggregated record subsets 208, user interface 210, etc. Modules and data 606 also may include computer-readable instructions associated with performing any of the operations of the duplicate record detector 110 described herein. The modules and data 606 can also include any other modules and/or data that can be utilized by the computing device 602 to perform or enable performing any action taken by the duplicate record detector 110 and/or other related components or systems described herein. Such other modules and data can include a platform, operating system, and applications, and data utilized by the platform, operating system, and applications.

The computing device 602 can also have processor(s) 608, communication interfaces 610, displays 612, output devices 614, input devices 616, and/or a drive unit 618 including a machine readable medium 620.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in the memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections.

The display 612 can be a liquid crystal display or any other type of display commonly used in computing devices. For example, the display 612 may be a touch-sensitive display screen, and can then also act as an input device or keypad, such as for providing a soft-key keyboard, navigation buttons, or any other type of input.

The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 604, processor(s) 608, and/or communication interface(s) 610 during execution thereof by the computing device 602. The memory 604 and the processor(s) 608 also can constitute machine readable media 620.

Thus, as described herein, the duplicate record detector 110 and its related components may implement various features and techniques that can improve the performance and reduce the computational and memory resources used when perform duplicate record analysis and detection in large and/or multi-cluster data architectures. The systems and techniques described herein can improve the performance and accuracy of detecting duplicate (or otherwise associated) sets of records within such large or multi-cluster systems. In some cases, by using pre-filtering to retrieve specific initial record sets from the various clusters, these techniques can reduce the computational and memory resources, and reduce bandwidth when retrieving potential duplicate record sets from multi-cluster (or other distributed) data architectures. The techniques described herein also may leverage one or more cross-cluster indexes to generate reduce record sets. Because the reduced record sets may be generated during an intermediate step before applying the duplicate matching logic, the compute and memory requirements of the duplicate detection process can be reduced, and the execution time for duplicate detection can be improved. Further, through customization of the pre-filtering queries and/or the record matching logic applied by the duplicate record detector, these techniques may provide improved efficiency and flexibility by allowing different systems, applications, and/or services to implement unique definitions of duplicate or associated records.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A multi-cluster data storage system, comprising:
   a first computing cluster of a first datacenter, the first computing cluster comprising a first database instance executing on a first server, the first computing cluster storing a first set of records;
   a second computing cluster of a second datacenter separate from the first datacenter, the second computing cluster comprising a second database instance executing on a second server, the second computing cluster storing a second set of records;
   a search server executing separate from the first server and the second server, the search server comprising storing a multi-cluster index having a sorted object identifier key; and
   a duplicate record detector comprising one or more processors and one or more non-transitory computer-readable media storing computer-executable instructions that, when executed by the one or more processors, cause the one or more processors to perform operations comprising:
   retrieving a first set of records from the first computing cluster;
   paring the first set of records, into a first pared subset of records, based at least in part on the multi-cluster index;
   retrieving a second set of records from the second computing cluster;
   paring the second set of records, into a second pared subset of records, based at least in part on the multi-cluster index; and
   determining a duplicate record, based at least in part on comparing the first pared subset of records and the second pared subset of records.

2. The multi-cluster data storage system of claim 1, wherein determining the duplicate record comprises:
   determining a first value of an attribute associated with a first record in the first pared subset of records;
   determining a second value of the attribute associated with a second record in the second pared subset of records; and
   comparing the first value and the second value.

3. The multi-cluster data storage system of claim 2, wherein the multi-cluster index does not store the attribute.

4. The multi-cluster data storage system of claim 2, the operations further comprising:
   removing, based on determining the duplicate record, at least one of the first record from the first computing cluster or the second record from the second computing cluster.

5. The multi-cluster data storage system of claim 2, wherein:
   determining the first set of records comprises querying the first computing cluster based on a second attribute different from the attribute; and
   determining the second set of records comprises querying the second computing cluster based on the second attribute.

6. The multi-cluster data storage system of claim 1, wherein:
the duplicate record comprises a policy record associated with a first object identifier; and
the multi-cluster index stores a sorted object identifier key, including a cluster identifier associated with each object identifier in the sorted object identifier key.

7. The multi-cluster data storage system of claim 1, wherein the duplicate record detector is executed within a cross-cluster service.

8. The multi-cluster data storage system of claim 1, further comprising:
a third computing cluster comprising a third database instance executing on a third server, the third cluster storing a third set of records, wherein the duplicate record detector is configured to determine the duplicate record from within an aggregation of:
the first pared subset of records retrieved from the first computing cluster;
the second pared subset of records retrieved from the second computing cluster; and
a third pared subset of records retrieved from the third computing cluster.

9. A computer-implemented method, comprising:
retrieving, by a cross-cluster duplicate record detector, a first set of records from a first computing cluster stored in a first datacenter, wherein each of the first set of records is associated with an object identifier;
determining, by the cross-cluster duplicate record detector, a reduced first subset of the first set of records, based at least in part on a multi-cluster index having a sorted object identifier key;
retrieving, by the cross-cluster duplicate record detector, a second set of records from a second computing cluster stored in a second datacenter separate from the first datacenter, wherein each of the second set of records is associated with an object identifier;
determining, by the cross-cluster duplicate record detector, a reduced second subset of the second set of records, based at least in part on the multi-cluster index; and
determining a duplicate record, by the cross-cluster duplicate record detector, based at least in part on comparing the first reduced subset of records and the second reduced subset of records.

10. The computer-implemented method of claim 9, wherein determining the duplicate record comprises:
determining a first value of an attribute associated with a first record in the first reduced subset of records;
determining a second value of the attribute associated with a second record in the second reduced subset of records; and
comparing the first value and the second value.

11. The computer-implemented method of claim 10, wherein the multi-cluster index does not store the attribute.

12. The computer-implemented method of claim 10, wherein:
retrieving the first set of records comprises querying the first computing cluster based on a second attribute different from the attribute; and
retrieving the second set of records comprises querying the second computing cluster based on the second attribute.

13. The computer-implemented method of claim 10, further comprising:
analyzing the first value and the second value to determine that the first record matches the second record, wherein the first value and second value are non-identical values.

14. The computer-implemented method of claim 9, wherein determining the duplicate record comprises generating an aggregation of:
the first reduced subset of records retrieved from the first computing cluster;
the second reduced subset of records retrieved from the second computing cluster; and
a third reduced subset of records retrieved from a third computing cluster of a multi-cluster data storage system.

15. One or more computing devices, comprising:
one or more processors; and
memory storing computer-executable instructions that, when executed by the one or more processors, cause the one or more processors to perform operations comprising:
retrieving a first set of records from a first computing cluster stored in a first datacenter, wherein each of the first set of records is associated with an object identifier;
determining a reduced first subset of the first set of records, based at least in part on a multi-cluster index having a sorted object identifier key;
retrieving a second set of records from a second computing cluster stored in a second datacenter separate from the first datacenter, wherein each of the second set of records is associated with an object identifier;
determining a reduced second subset of the second set of records, based at least in part on the multi-cluster index; and
determining a duplicate record, based at least in part on comparing the first reduced subset of records and the second reduced subset of records.

16. The one or more computing devices of claim 15, wherein determining the duplicate record comprises:
determining a first value of an attribute associated with a first record in the first reduced subset of records;
determining a second value of the attribute associated with a second record in the second reduced subset of records; and
comparing the first value and the second value.

17. The one or more computing devices of claim 16, wherein:
retrieving the first set of records comprises querying the first computing cluster based on a second attribute different from the attribute; and
retrieving the second set of records comprises querying the second computing cluster based on the second attribute.

18. The multi-cluster data storage system of claim 1, wherein the sorted object identifier key of the multi-cluster index stores, for each unique object identifier in the sorted object identifier key, one or more associations between the unique object identifier and one or more computing clusters.

19. The computer-implemented method of claim 9, wherein the sorted object identifier key of the multi-cluster index stores, for each unique object identifier in the sorted object identifier key, one or more associations between the unique object identifier and one or more computing clusters.

20. The one or more computing devices of claim 15, wherein the sorted object identifier key of the multi-cluster index stores, for each unique object identifier in the sorted object identifier key, one or more associations between the unique object identifier and one or more computing clusters.

\* \* \* \* \*